US012745120B2

(12) United States Patent
Dalsgaard et al.

(10) Patent No.: US 12,745,120 B2
(45) Date of Patent: Sep. 22, 2026

(54) EVENT-TRIGGERED EARLY MEASUREMENT REPORT REPORTING

(71) Applicant: Nokia Technologies Oy, Espoo (FI)

(72) Inventors: Lars Dalsgaard, Oulu (FI); Jani-Pekka Kainulainen, Cambridge (GB)

(73) Assignee: Nokia Technologies Oy, Espoo (FI)

(*) Notice: Subject to any disclaimer, the term of this patent is extended or adjusted under 35 U.S.C. 154(b) by 328 days.

(21) Appl. No.: 18/473,032

(22) Filed: Sep. 22, 2023

(65) Prior Publication Data

US 2024/0129780 A1 Apr. 18, 2024

Related U.S. Application Data

(60) Provisional application No. 63/415,412, filed on Oct. 12, 2022.

(51) Int. Cl.

| | |
|---|---|
| ***H04W 24/10*** | (2009.01) |
| ***H04L 5/00*** | (2006.01) |
| ***H04W 28/16*** | (2009.01) |
| ***H04W 48/16*** | (2009.01) |
| *H04W 8/24* | (2009.01) |
| *H04W 76/15* | (2018.01) |
| *H04W 76/27* | (2018.01) |

(52) U.S. Cl.

CPC .......... *H04W 24/10* (2013.01); *H04L 5/0048* (2013.01); *H04W 28/16* (2013.01)

(58) Field of Classification Search

CPC ..... H04W 24/10; H04W 28/16; H04W 28/18; H04W 76/15; H04W 76/19; H04W 76/27; H04W 76/28; H04W 76/34; H04W 36/0058; H04W 36/0061; H04W 36/30; H04W 36/0069; H04W 8/24; H04L 5/0032; H04L 5/0048

See application file for complete search history.

(56) References Cited

U.S. PATENT DOCUMENTS

2020/0344629 A1 10/2020 Kim
2020/0403743 A1* 12/2020 Bergqvist .............. H04L 5/0032
2021/0392537 A1* 12/2021 Da Silva .............. H04W 24/10

(Continued)

FOREIGN PATENT DOCUMENTS

WO 2020/263165 A1 12/2020

OTHER PUBLICATIONS

"3rd Generation Partnership Project; Technical Specification Group Radio Access Network; NR; Requirements for support of radio resource management (Release 17)", 3GPP TS 38.133, V17.6.0, Jun. 2022, 3637 pages.

(Continued)

*Primary Examiner* — Moo Jeong
*Assistant Examiner* — Scott A Schlack
(74) *Attorney, Agent, or Firm* — Robert P. Michal, Esq.; Rimon PC

(57) ABSTRACT

Systems, methods, apparatuses, and computer program products for event-triggered EMR reporting. One method may include receiving, at a user equipment, from a network entity, a measurement configuration for early measurement reporting. The measurement configuration may include at least one early measurement reporting event associated with the user equipment re-accessing the network entity. The method may further include transmitting, to the network entity, an early measurement reporting result.

1 Claim, 8 Drawing Sheets

(56) References Cited

U.S. PATENT DOCUMENTS

| | | | | |
|---|---|---|---|---|
| 2022/0046747 | A1* | 2/2022 | Da Silva | H04W 52/0229 |
| 2022/0132348 | A1* | 4/2022 | Orsino | H04W 76/27 |
| 2022/0150741 | A1* | 5/2022 | Teyeb | H04L 5/001 |
| 2022/0394568 | A1* | 12/2022 | Teyeb | H04W 48/12 |

OTHER PUBLICATIONS

"Msc-generator", Sourceforge, Retrieved on Oct. 11, 2023, Webpage available at : https://sourceforge.net/projects/msc-generator/.

Extended European Search Report received for corresponding European Patent Application No. 23199705.7, dated Feb. 19, 2024, 9 pages.

"Draft CR to TS 38.133: Correction to Rel-17 IDLE CA/DC measurements requirements", 3GPP TSG-RAN4 Meeting #103-e, R4-2208830, vivo, May 9-20, 2022, 4 pages.

* cited by examiner

EVENT-TRIGGERED EARLY MEASUREMENT REPORT REPORTING

RELATED APPLICATION

This application claims priority from, and the benefit of, U.S. Provisional Application No. 63/415,412 filed on Oct. 12, 2022, which is hereby incorporated by reference in its entirety.

TECHNICAL FIELD

Some example embodiments may generally relate to mobile or wireless telecommunication systems, such as 3$^{rd}$ Generation Partnership Project (3GPP) Long Term Evolution (LTE), 5$^{th}$ generation (5G) radio access technology (RAT), new radio (NR) access technology, 6$^{th}$ generation (6G), and/or other communications systems. For example, certain example embodiments may relate to systems and/or methods for event-triggered early measurement report (EMR) reporting.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the radio access network (RAN) for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, at a user equipment, from a network entity, a measurement configuration for early measurement reporting. The measurement configuration comprises at least one early measurement reporting event associated with the user equipment re-accessing the network entity. The method may further include transmitting, to the network entity, an early measurement reporting result.

In accordance with certain example embodiments, an apparatus may include means for receiving, from a network entity, a measurement configuration for early measurement reporting. The measurement configuration comprises at least one early measurement reporting event associated with the apparatus re-accessing the network entity. The apparatus may further include means for transmitting, to the network entity, an early measurement reporting result.

In accordance with various example embodiments, a non-transitory computer readable medium may include program instructions that, when executed by an apparatus, cause the apparatus to perform at least a method. The method may include receiving, from a network entity, a measurement configuration for early measurement reporting. The measurement configuration comprises at least one early measurement reporting event associated with the apparatus re-accessing the network entity. The method may further include transmitting, to the network entity, an early measurement reporting result.

In accordance with some example embodiments, a computer program product may perform a method. The method may include receiving, from a network entity, a measurement configuration for early measurement reporting. The measurement configuration comprises at least one early measurement reporting event associated with a user equipment re-accessing the network entity. The method may further include transmitting, to the network entity, an early measurement reporting result.

In accordance with certain example embodiments, an apparatus may include at least one processor and at least one memory storing instructions that, when executed by the at least one processor, cause the apparatus at least to receive, from a network entity, a measurement configuration for early measurement reporting. The measurement configuration comprises at least one early measurement reporting event associated with the apparatus re-accessing the network entity. The at least one memory and instructions, when executed by the at least one processor, may further cause the apparatus at least to transmit, to the network entity, an early measurement reporting result.

In accordance with various example embodiments, an apparatus may include receiving circuitry configured to receive, from a network entity, a measurement configuration for early measurement reporting. The measurement configuration comprises at least one early measurement reporting event associated with the apparatus re-accessing the network entity. The apparatus may further include transmitting circuitry configured to transmit, to the network entity, an early measurement reporting result.

In accordance with some example embodiments, a method may include transmitting, by a network entity, to a user equipment, a measurement configuration for early measurement reporting. The measurement configuration comprises at least one early measurement reporting event associated with the user equipment re-accessing the network entity. The method may further include receiving, from the user equipment, an early measurement reporting result.

In accordance with certain example embodiments, an apparatus may include means for transmitting, to a user equipment, a measurement configuration for early measurement reporting. The measurement configuration comprises at least one early measurement reporting event associated with the user equipment re-accessing the apparatus. The apparatus may further include means for receiving, from the user equipment, an early measurement reporting result.

In accordance with various example embodiments, a non-transitory computer readable medium may include program instructions that, when executed by an apparatus, cause the apparatus to perform at least a method. The method may include transmitting, to a user equipment, a measurement configuration for early measurement reporting. The measurement configuration comprises at least one early measurement reporting event associated with the user equipment re-accessing the apparatus. The method may further include receiving, from the user equipment, an early measurement reporting result.

In accordance with some example embodiments, a computer program product may perform a method. The method may include transmitting, by a network entity, to a user equipment, a measurement configuration for early measurement reporting. The measurement configuration comprises at least one early measurement reporting event associated with the user equipment re-accessing the network entity. The method may further include receiving, from the user equipment, an early measurement reporting result.

In accordance with certain example embodiments, an apparatus may include at least one processor and at least one memory storing instructions that, when executed by the at least one processor, cause the apparatus at least to transmit, to a user equipment, a measurement configuration for early measurement reporting. The measurement configuration comprises at least one early measurement reporting event associated with the user equipment re-accessing the apparatus. The at least one memory and instructions, when executed by the at least one processor, may further cause the apparatus at least to receive, from the user equipment, an early measurement reporting result.

In accordance with various example embodiments, an apparatus may include transmitting circuitry configured to transmit, to a user equipment, a measurement configuration for early measurement reporting. The measurement configuration comprises at least one early measurement reporting event associated with the user equipment re-accessing the apparatus. The apparatus may further include receiving circuitry configured to receive, from the user equipment, an early measurement reporting result.

BRIEF DESCRIPTION OF THE DRAWINGS

For a proper understanding of example embodiments, reference should be made to the accompanying drawings, wherein.

DETAILED DESCRIPTION

Figure 1:
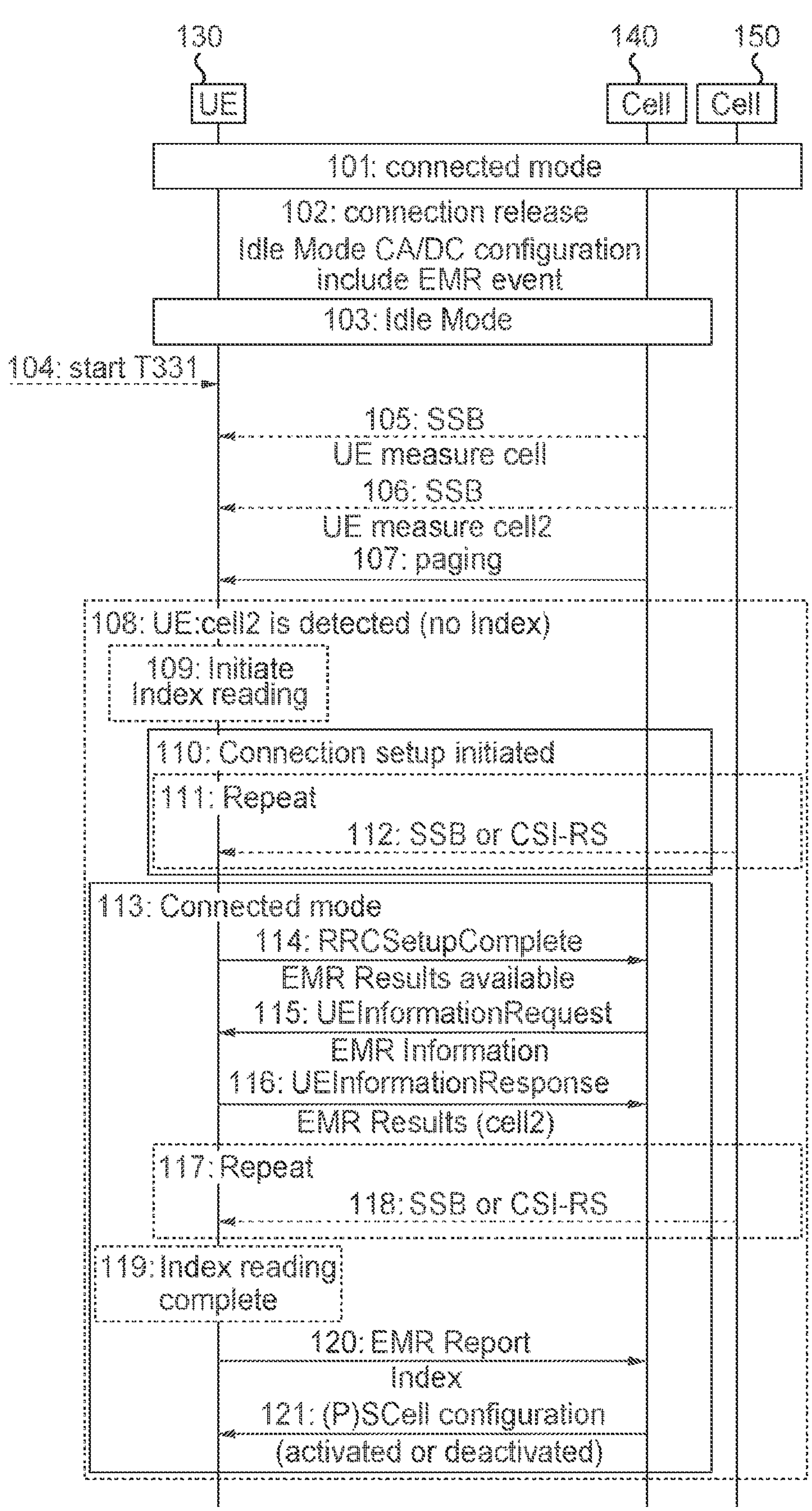
FIG. 1 illustrates an example of a signaling diagram according to certain example embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for event-triggered EMR reporting is not intended to limit the scope of certain example embodiments, but is instead representative of selected example embodiments.

3GPP continues to develop carrier aggregation (CA) and dual connectivity (DC) setup for UEs transitioning from idle/inactive mode to connected mode. In particular, 3GPP has been in development of techniques related to reducing setup latencies with CA and/or DC by focusing on frequency range (FR)2 carriers (e.g., using cells in higher frequencies for CA and/or DC).

For example, 3GPP Rel-15 defined a procedure where an LTE network can may configure the UE to measure carriers in idle mode in order to report measurement results from those carriers at connection setup. Based on the measurement results, the network could configure the UE with CA or DC once the UE is in connected mode. As a result, CA/DC setup time would be reduced since the network could use the reported results from idle to set up CA/DC without a delay of waiting to receive a measurement report based on measurements performed only once when entering connected mode and configured with a measurement configuration.

Similarly, 3GPP Rel-16 expanded this technique to NR inter-RAT measurements for a UE in LTE idle mode. Additionally, 3GPP Rel-16 defined the CA/DC idle mode measurements (i.e., "early measurement reporting procedure" (EMR)) in NR. This would enable the network to configure the UE with EMR in NR for both NR inter-frequency carriers and LTE inter-RAT carriers.

3GPP Rel-17 provided further several improvements to this CA/DC procedure, including fast secondary cell (SCell) activation by using assistance reference signals to improve the UE time tracking opportunities for the activated SCell. In addition, 3GPP Rel-17 defined the deactivated SCG and the related secondary cell group (SCG)/primary serving cell (PSCell) activation delay.

3GPP Rel-18 is currently refining CA/DC setup delay for FR2 SCell and PSCell when the UE enters connected mode (from idle/inactive mode). However, FR2 cells and the related measurements have some disadvantages with detection and measurement delay requirements, which may be very relaxed and may lead to a lengthy CA/DC setup time for FR2 SCell and PSCell.

3GPP states that, for carriers configured for inter-frequency (NR) CA/DC candidate cells, while T331 is running, the UE shall perform measurements on the configured inter-frequency carriers for idle mode CA/DC measurement reporting according to the UE measurement capability. In particular, a UE which supports idleInactiveNR-MeasReport-r16 shall support idle mode CA/DC measurements of at least 7 inter-frequency carriers which are also configured for inter-frequency mobility measurements, and at least 7 inter-frequency carriers which are not configured for inter-frequency mobility measurements. The UE shall be capable of monitoring a total of at least 7 inter-frequency carriers for idle mode CA/DC measurements comprising of carriers configured for inter-frequency mobility measurements and carriers not configured for inter-frequency mobility measurements.

Furthermore, for inter-frequency carriers configured for idle mode CA/DC measurements, if Srxlev$\leq S_{nonIntraSearchP}$ or Squal$\leq S_{nonIntraSearchQ}$, certain inter-frequency measurement requirements may apply, where the UE shall search for and measure inter-frequency layers configured for idle mode CA/DC measurements in preparation for possible reporting. If Srxlev$>S_{nonIntraSearchP}$ and Squal$>S_{nonIntraSearchQ}$, the UE may search for inter-frequency layers configured for idle mode CA/DC measurements at least every $T_{higher\_priority\_search}$, where the UE shall search for and measure inter-frequency layers configured for idle mode CA/DC measurements in preparation for possible reporting.

For UE supporting idleInactiveNR-MeasBeamReport-r16, if the UE is configured with beamMeasConfigIdle-r16 for idle mode CA/DC measurement, the UE shall be capable of performing SS-reference signal received power (RSRP), SS-reference signal received quality (RSRQ) for at least 7 synchronization signal blocks (SSBs) with different SSB index and/or physical cell identifier (PCI) on an inter-frequency layer in FR1, and/or 0 SSBs with different SSB index and/or PCI on an inter-frequency layer in FR2.

For UE supporting idleInactiveNR-MeasBeamReport-r16, if the UE is configured with beamMeasConfigIdle-r16 on one or more carrier for idle mode CA/DC measurement, the UE, on each carrier, shall be able to: detect a newly detectable inter-frequency NR cell and perform RSRP/RSRQ measurement in preparation for reporting, and acquire the SSB index for a newly detectable inter-frequency NR cell if beamMeasConfigIdle-r16 if configured on this carrier and perform RSRP/RSRQ measurement in preparation for reporting, within the requirements defined in clause 4.2.2.4 plus k*$T_{SSB\_index,NR}$. k is the number of carriers configured for idle mode CA measurement with beamMeasConfigIdle-r16, and $T_{SSB\_index,NR}$ is the additional time period used to acquire the index of the SSB being measured, according to Table 1 below:

TABLE 1

| DRX cycle length [s] | Scaling Factor (N1) FR1 | FR2[Note1] | $T_{SSB\_index, NR\_Inter}$ [S] (number of DRX cycles) |
|---|---|---|---|
| 0.32 | 1 | 8 | N2 × 1.28 × N1 × 1.5 (N2 × 4 × N1 × 1.5) |
| 0.64 | | 5 | N2 × 1.28 × N1 (N2 × 2 × N1) |
| 1.28 | | 4 | N2 × 1.28 × N1 (N2 × 1 × N1) |
| 2.56 | | 3 | N2 × 2.56 × N1 (N2 × 1 × N1) |

Note1:

Applies for UE supporting power class 2&3&4. For UE supporting power class 1, N1 = 8 for all DRX cycle length.

NOTE 2:

N2 = 3 if the NR inter-frequency carrier for idle mode CA/DC measurement reporting is in FR1, and N2 = 3, 5 if the NR inter-frequency carrier for idle mode CA/DC measurement reporting is in FR2.

In the absence or expiration of T331, it is up to UE implementation to perform the idle mode CA/DC measurement. For inter-frequency carriers configured for idle mode CA/DC measurements, the UE shall be capable of performing SS-RSRP and SS-RSRQ measurements of the carriers, and the UE physical layer shall be capable of reporting SS-RSRP and SS-RSRQ measurements of the carriers configured for idle mode CA/DC measurements to higher layers, with measurement accuracy. The UE shall be able to report idle mode CA/DC measurements when idle mode CA/DC measurement reporting is requested by the network.

In general, these requirements may only apply while the T331 timer is running (i.e., hasn't yet expired). Disregarding the case where search thresholds are used (If Srxlev>$S_{nonIntraSearchP}$ and Squal>$S_{nonIntraSearchQ}$) and Srxlev/qual is lower than the thresholds, the UE measurement requirements for carrier configured for idle mode CA/DC. This means that for NR FR2 cell the detection time can be very long, as shown in Table 2 below:

TABLE 2

| DRX cycle length [s] | Scaling Factor (N1) FR1 | FR2[Note1] | $T_{detect, NR\_Inter}$ [s] (number of DRX cycles) | $T_{measure, NR\_Inter}$ [s] (number of DRX cycles) | $T_{evaluate, NR\_Inter}$ [s] (number of DRX cycles) |
|---|---|---|---|---|---|
| 0.32 | 1 | 8 | 11.52 × N1 × 1.5 (36 × N1 × 1.5) | 1.28 × N1 × 1.5 (4 × N1 × 1.5) | 5.12 × N1 × 1.5 (16 × N1 × 1.5) |
| 0.64 | | 5 | 17.92 × N1 (28 × N1) | 1.28 × N1 (2 × N1) | 5.12 × N1 (8 × N1) |
| 1.28 | | 4 | 32 × N1 (25 × N1) | 1.28 × N1 (1 × N1) | 6.4 × N1 (5 × N1) |
| 2.56 | | 3 | 58.88 × N1 (23 × N1) | 2.56 × N1 (1 × N1) | 7.68 × N1 (3 × N1) |

Note1:

Applies for UE supporting power class 2&3&4. For UE supporting power class 1 or 5, N1 = 8 for all DRX cycle length.

and assuming discontinuous reception (DRX) cycle of 320 ms, N1=8 and the minimum requirement regarding cell detection time requirement is 11.52*8*1.5~=130-140 seconds.

Table 3 below summarized the detection delays:

TABLE 3

| D = DRX cyclelength [s] | SF = FR2 Scaling factor (constant) | C = UE constant | t_detect | Tdetect, NR_Inter [s] = D*SF*C*t_detect |
|---|---|---|---|---|
| 0.32 | 8 | 1.5 | 36*8*1.5 DRX cycles | 138.24 seconds |
| 0.64 | 5 | 1 | 28*5 DRX Cycles | 89.6 seconds |
| 1.28 | 4 | 1 | 25*4 DRX Cycles | 128 seconds |
| 2.56 | 3 | 1 | 23*3 DRX Cycles | 176.64 seconds |

For connected devices, a similar minimum requirement for inter-frequency cell detection is defined and has a lower bound of 600 ms. However, one disadvantage can occur when a UE that has been configured with EMR (i.e., configured to perform idle mode CA/DC measurements) for improved CA/DC setup has no valid measurement results to report at connection setup. In this case, the UE inter-frequency measurement delay may be expected to take very long time (based on NR inter-frequency measurements), which may cause very inefficient use of CA/DC.

Another disadvantage may be for a UE that has some incomplete EMR measurement results ongoing while not fully verified (e.g., cell detection is ongoing when connection setup start). The UE may be unable to provide the network with EMR results, causing a long CA/DC setup delay.

Another problem occurs for a UE that has EMR results, but the timer T331 has expired. In this situation, the UE may be allowed to continue the results, and indicate to the network at connection setup that EMR results are available. However, since there are no defined UE requirements for when T331 has expired, the reported EMR results from the UE are not useful to the network due to lack of accuracy requirements for the reported results. Thus, it would be desirable to allow an enhanced and more flexible reporting method for the UE regarding EMR results.

Certain example embodiments described herein may have various benefits and/or advantages to overcome the disadvantages described above. Due to the specific FR2 cell detection, Index reading, and measurement delays, which may depend on UE Rx beam sweeping usage, the actual delays may be very long and vary significantly based on the initial UE and cell conditions at the time when connection setup occurs. Thus, it may be very difficult for the network to estimate when potential UE EMR measurements would be available on the UE side for reporting, and when such measurements could be requested by the network. To address these challenges, some example embodiments may introduce event-based EMR reporting. For example, the event-based EMR reporting may apply to FR2 cells, but may also apply for FR1 and other cells. Thus, certain example embodiments discussed below are directed to improvements in computer-related technology.

In certain example embodiments, an EMR event may be specifically configured to trigger reporting of measurement results (e.g., with index reporting) from a carrier configured for idle mode CA/DC measurements. Alternatively, the EMR event may be configured for a carrier not explicitly configured for EMR (e.g., for a UE which does not support EMR). However, the purpose of the reporting event is for reporting cells and enhancing CA and/or DC setup.

In some example embodiments, the EMR event may be configured together with the Idle mode CA/DC configuration. This may occur once the UE is released to Idle mode and/or via system information block (SIB) EMR information. Alternatively, the EMR event may be configured once the UE enters the connected mode (e.g., if idle mode CA/DC measurements have been configured), and the UE may indicate that EMR results are not available, partly available, or ongoing (i.e., started but not finished).

In various example embodiments, the EMR event may be configured with CA/DC idle mode measurements, but the timer (i.e., T331) has expired while the UE indicates Idle mode CA/DC idle mode measurements available. Hence, the EMR event and reporting configuration may remain valid despite the timer (i.e., T331) expiring. This may help to validate the EMR measurements and the accuracy of EMR results reported by a UE even after the timer has expired.

According to certain example embodiments, the EMR event may be configured for a UE that does not support idle mode CA/DC measurements (e.g., if the UE indicates ability or inability to support enhanced early measurements for CA/DC idle mode measurements). Specifically, the UE may indicate that it does not support idle mode CA/DC measurements but does support these events; alternatively, the UE may indicate that it supports idle mode CA/DC measurement but is not configured to perform idle mode CA/DC measurements. Thus, the UE may not support CA/DC idle mode measurements or not configured with CA/DC idle mode measurement reporting.

In some example embodiments, the one or more EMR event trigger(s) may be based on target cell conditions, such as neighbor cell (e.g., target EMR cell) becomes better than a threshold, an event may be triggered with or without an index, after successful index reading of potential target cell, and/or at least a time limit that the UE will report with available results. For example, an EMR event trigger may include a time limit after being configured with the EMR event, after indicating that EMR measurements are available, and/or after the UE has entered a connected mode or initiated connection setup (e.g., mobile-originated and/or mobile-terminated call).

In various example embodiments, the measurement event may only be valid for a restricted/limited time period after the UE has established a connection after which the UE is not allowed to trigger reporting based on the event.

Figure 7:
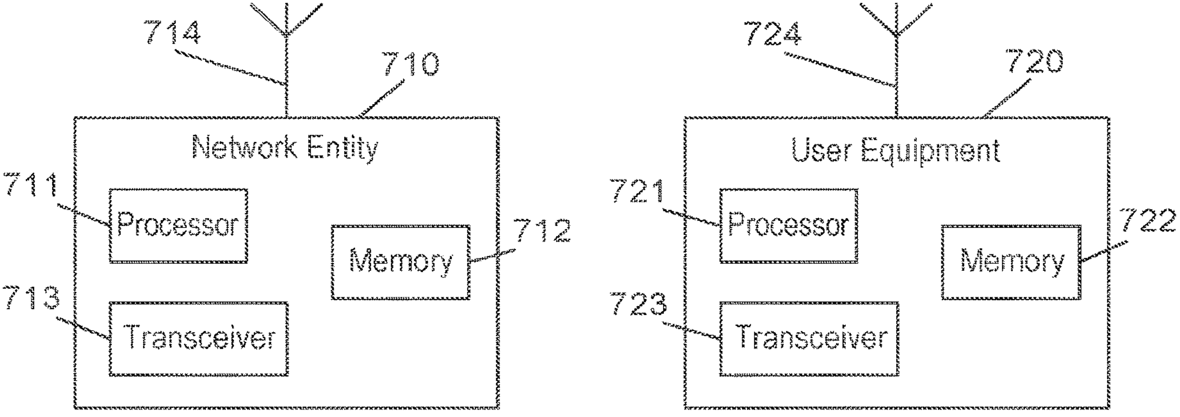
FIG. 7 illustrates an example of various network devices according to certain example embodiments.

FIG. 1 illustrates an example of a signaling diagram depicting for event-triggered EMR reporting. UE 130, serving cell 140, and neighbor cell 150 may be similar to NE 710 and UE 720, as illustrated in FIG. 7, according to certain example embodiments.

At 101, UE 130, serving cell 140, and neighbor cell 150 may be in a connected mode, and may be configured with either CA, DC, or both (i.e., CA/DC). In particular, UE 130 may be in CA/DC with serving cell 140, with serving cell 140 being a primary cell (PCell), and neighbor cell 150 being a secondary cell (SCell)/primary serving cell (PSCell).

At 102, serving cell 140 may transmit a connection release message to UE 130, which may include an Idle Mode CA/DC configuration with EMR event. When the connection is released, UE 130 may be configured, as described. The release information may include the EMR event to be used by UE 130 when accessing the network (e.g., serving cell 140) again.

In certain example embodiments, the EMR configuration may include additional configuration information. For example, the information may include a configuration related to when and how to report any available EMRs when UE 130 returns to connected mode. In various example embodiments, this measurement configuration information may be included in the "Connection Release" message, for example, in the "include EMR event" information. However, other signaling solutions may also be used that may or may not be associated with the idle mode CA/DC measurement configuration. Hence, the signaling may also be applied for UEs not necessarily supporting the Idle mode CA/DC measurements and reporting feature, and may be applied as an additional feature.

At 103, UE 130 may enter an Idle Mode. UE 130 may be camped on serving cell 140, while neighbor cell 150 may be detected (while in connected mode) and remain detectable during the Idle Mode.

At 104, UE 130 may start a timer, such as a T331 timer.

At 105 and 106, UE 130 may perform measurements on at least serving cell 140, and may perform Idle Mode CA/DC measurements while in Idle Mode and while the timer is running, according to the UE requirements for Idle mode CA/DC measurements. For example, UE 130 may perform SSB measurements on serving cell 140, and/or may perform idle and/or non-idle mode CA/DC measurements on neighbor cell 150, according to its configuration, respectively.

At 107, a connection setup may be requested, either by UE 130 (i.e., mobile originated (MO)) or by either serving cell 140 or neighbor cell 150 (mobile terminated (MT) call/connection).

At 108, UE 130 may have detected and/or verified (e.g., verifying an already-detected cell, performing one or more measurements, etc.) neighbor cell 150, with or without an index. In some example embodiments, neighbor cell 150 may be a cell, or a cell on a carrier configured as part of idle mode CA/DC measurement configuration at the release. In some other example embodiments, neighbor cell 150 may be a cell (e.g., on or off a carrier) that has not been configured as part of idle mode CA/DC measurement configuration at the release. However, UE 130 may not have up-to-date measurement information (e.g., valid measurement results) or index information on neighbor cell 150 (e.g. UE 130 has or has not been able to read the index of neighbor cell 150 and/or UE 130 is not supporting index-based measurements in idle mode).

At 109, since UE 130 has been configured with EMR event reporting, UE 130 may initiate index reading on detected neighbor cell 150. In various example embodiments, UE 130 may only initiate index reading on one detected cell (i.e., neighbor cell 150), which could be selected by UE 130, for example, based on neighbor cell 150 being the best cell quality (e.g., based upon RSRP, RSRQ, etc.) among possibly more detected cells. In certain example embodiments, neighbor cell 150 may be indicated by the network. Alternatively, other selection criteria may be used.

At 110, a connection setup procedure may be ongoing between UE 130 and serving cell 140.

At 111, the process may be repeated where UE 130 measures and/or verifies neighbor cell 150. The index reading may continue in parallel with connection setup (and possibly for a period of time after connection has been established/completed) if this is needed (e.g., if UE 130 has already verified the Index, this step may not be performed).

At 112, UE 130 may perform additional SSB and/or CSI-RS measurements.

At 113, UE 130 may enter a Connected mode. One or more EMR events may be configured by the network. For example, the configuration may be based on UE 130 indicating that no EMR results are available (e.g., based on a network request, such as a UEInformationRequest IE with EMR information) and/or other signaling solutions.

At 114, when the connection setup is complete, UE 130 may indicate to serving cell 140 that EMR results are available.

At 115, serving cell 140 may transmit a UEInformation-Request information element (IE) to UE 130, with EMR information. At 116, UE 130 may respond to serving cell 140 with a UEInformationResponse IE with EMR results on neighbor cell 150.

In certain example embodiments, if the network requests the EMR results, UE 130 may reply that UE 130 has partial results. In some example embodiments, UE 130 may report available, but not ready, results to serving cell 140. In various example embodiments, serving cell 140 may indicate to UE 130 to stop further EMR related measurements.

The process may be repeated a plurality of times at 117; for example, at 118, UE 130 may repeat performing measurements, such as Index reading, SSB, and/or CSI-RS based measurements.

At 119, UE 130 may successfully evaluate that one or more EMR event(s) are fulfilled, for example, an RSRP, RSRQ, and/or Index reading event (i.e., Index reading is complete), and at 120, UE 130 may trigger a new measurement report to serving cell 140. Once the report has been sent to serving cell 140, UE 130 may no longer be required to perform further EMR related measurements, and thus may stop further measurements. Thus, at 121, serving cell 140 may transmit to UE 130 a (P)SCell configuration based on the reported EMR related measurement results, where PSCell or SCell(s) may be directly activated or deactivated.

Once UE 130 has reported the target cell with the index, the network may know which DL SSB (DL beam) UE 130 can receive, and on which the network can schedule UE 130. This may beneficial for CA and/or DC.

Figure 2:
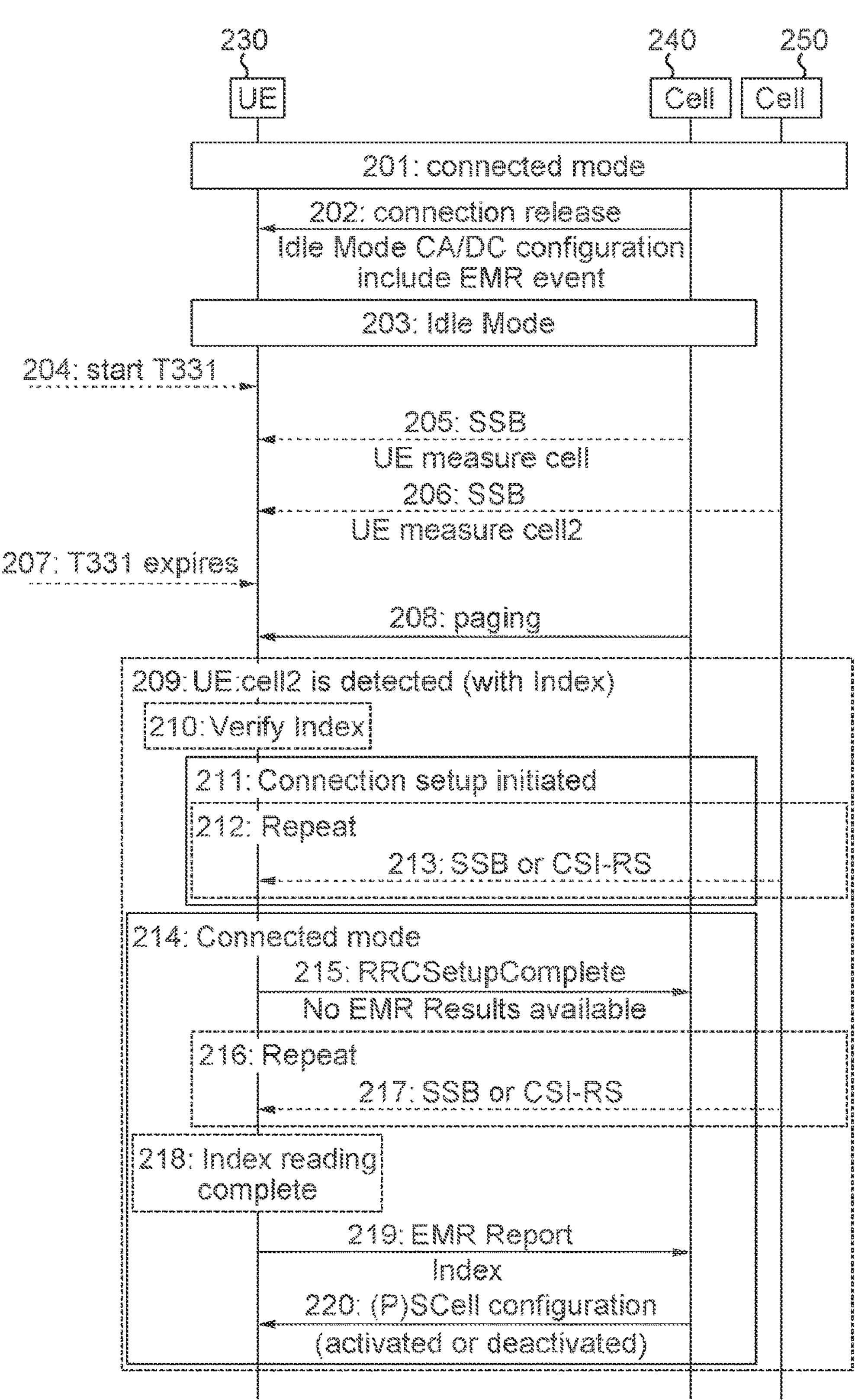
FIG. 2 illustrates an example of another signaling diagram according to some example embodiments.

FIG. 2 illustrates an example of a signaling diagram depicting for event-triggered EMR reporting. UE 230, serving cell 240, and neighbor cell 250 may be similar to NE 710 and UE 720, as illustrated in FIG. 7, according to certain example embodiments.

Although similar to the example embodiments described above in FIG. 1, the following example embodiments may include a timer (e.g., T331) that expires. Specifically, UE implementation may define whether UE 230 continues EMR measurements, and whether UE 230 indicates EMR results available when entering connected mode after the timer has expired. However, even if UE 230 indicates that results are available to the network, there may be no UE measurement accuracy requirements for the reported results once the timer has expired. Thus, any reported results may be unusable by the network. For an event-driven approach, UE 230 may send a measurement report for an EMR event when UE 230 has valid measurement results after the timer expires.

In addition, in some example embodiments, UE 230 may indicate that it does not have EMR results available at the RRC setup complete. However, since UE 230 may be configured with one or more EMR events, UE 230 may initiate, or may already have initiated, necessary measurements accordingly. UE 230 may verify the Index of the best DL beam in a detected cell, such as neighbor cell 250. Once UE 230 has verified the Index, UE 230 may transmit the measurement results to the network (e.g., based on the configured event).

At 201, UE 230, serving cell 240, and neighbor cell 250 may be in a connected mode, and may be configured with either CA, DC, or both (i.e., CA/DC). In particular, UE 230 may be in CA/DC with serving cell 240, with serving cell 240 being a PCell, and neighbor cell 250 being a SCell/PSCell.

At 202, serving cell 240 may transmit a connection release message to UE 230, which may include an Idle Mode CA/DC configuration with EMR event. When the connection is released, UE 230 may be configured, as described. The release information may include the EMR event to be used by UE 230 when accessing the network (e.g., serving cell 240) again.

In certain example embodiments, the EMR configuration may include additional configuration information. For example, the information may include a configuration related to when and how to report any available EMRs when UE 230 returns to connected mode. In various example embodiments, this measurement configuration information may be included in the "Connection Release" message, for example, in the "include EMR event" information. However, other signaling solutions may also be used that may or may not be associated with the idle mode CA/DC measurement configuration. Hence, the signaling may also be applied for UEs not necessarily supporting the Idle mode CA/DC measurements and reporting feature, and may be applied as an additional feature.

At 203, UE 230 may enter an Idle Mode. UE 230 may be camped on serving cell 240, while neighbor cell 250 may be detected (while in connected mode) and remain detectable during the Idle Mode.

At 204, UE 230 may start a timer, such as a T331 timer.

At 205 and 206, UE 230 may perform measurements on at least serving cell 240, and may perform Idle Mode CA/DC measurements while in Idle Mode and while the timer is running, according to the UE requirements for Idle mode CA/DC measurements. For example, UE 230 may perform SSB measurements on serving cell 240, and/or may perform idle and/or non-idle mode CA/DC measurements on neighbor cell 250, according to its configuration, respectively.

At 207, the timer may expire. After the timer expires, at 208, a connection setup may be requested, either by UE 230 (i.e., MO) or by either serving cell 240 or neighbor cell 250 (MT call/connection).

At 209, UE 230 may have detected and/or verified (e.g., verifying an already-detected cell, performing one or more measurements, etc.) neighbor cell 250, with or without an index. In some example embodiments, neighbor cell 250 may be a cell, or a cell on a carrier configured as part of idle mode CA/DC measurement configuration at the release. In some other example embodiments, neighbor cell 250 may be a cell (e.g., on or off a carrier) that has not been configured as part of idle mode CA/DC measurement configuration at the release. However, UE 230 may not have up-to-date measurement information (e.g., valid measurement results) or index information on neighbor cell 250 (e.g. UE 230 has or has not been able to read the index of neighbor cell 250 and/or UE 230 is not supporting index-based measurements in idle mode). At 210, UE 230 may verify the index, which may be initiated based on the configured EMR event. In some example embodiments, UE 230 may have read and potentially verified the Index.

At 211, a connection setup procedure may be ongoing between UE 230 and serving cell 240.

At 212, the process may be repeated where UE 230 measures and/or verifies neighbor cell 250. The index reading may continue in parallel with connection setup (and possibly for a period of time after connection has been established/completed) if this is needed (e.g., if UE 230 has already verified the Index, this step may not be performed).

At 213, UE 230 may perform additional SSB and/or CSI-RS measurements.

At 214, UE 230 may enter a Connected mode. Since the timer expired at 207, one or more of EMR events may be configured by the network. For example, the configuration may be based on UE 230 indicating that no EMR results are available (e.g., based on a network request, such as a UEInformationRequest IE with EMR information) and/or other signaling solutions.

At 215, when the connection setup is complete, UE 230 may indicate to serving cell 240 that no EMR results are available.

The process may be repeated a plurality of times at 216; for example, at 217, UE 230 may repeat performing measurements, such as Index reading, SSB, and/or CSI-RS based measurements.

At 218, UE 230 may fulfill one or more EMR event(s) (e.g., Index reading is complete), and at 219, UE 230 may trigger a new measurement report to serving cell 240. Once the report has been sent to serving cell 240, UE 230 may no longer be required to perform further EMR related measurements. Thus, at 221, serving cell 240 may transmit to UE 230 a (P)SCell configuration based on the reported EMR related measurement results, where PSCell or SCell(s) may be directly activated or deactivated.

Once UE 230 has reported the target cell with the index, the network may know which DL SSB (DL beam) UE 230 can receive, and on which the network can schedule UE 230. This may beneficial for CA and/or DC.

Figure 3:
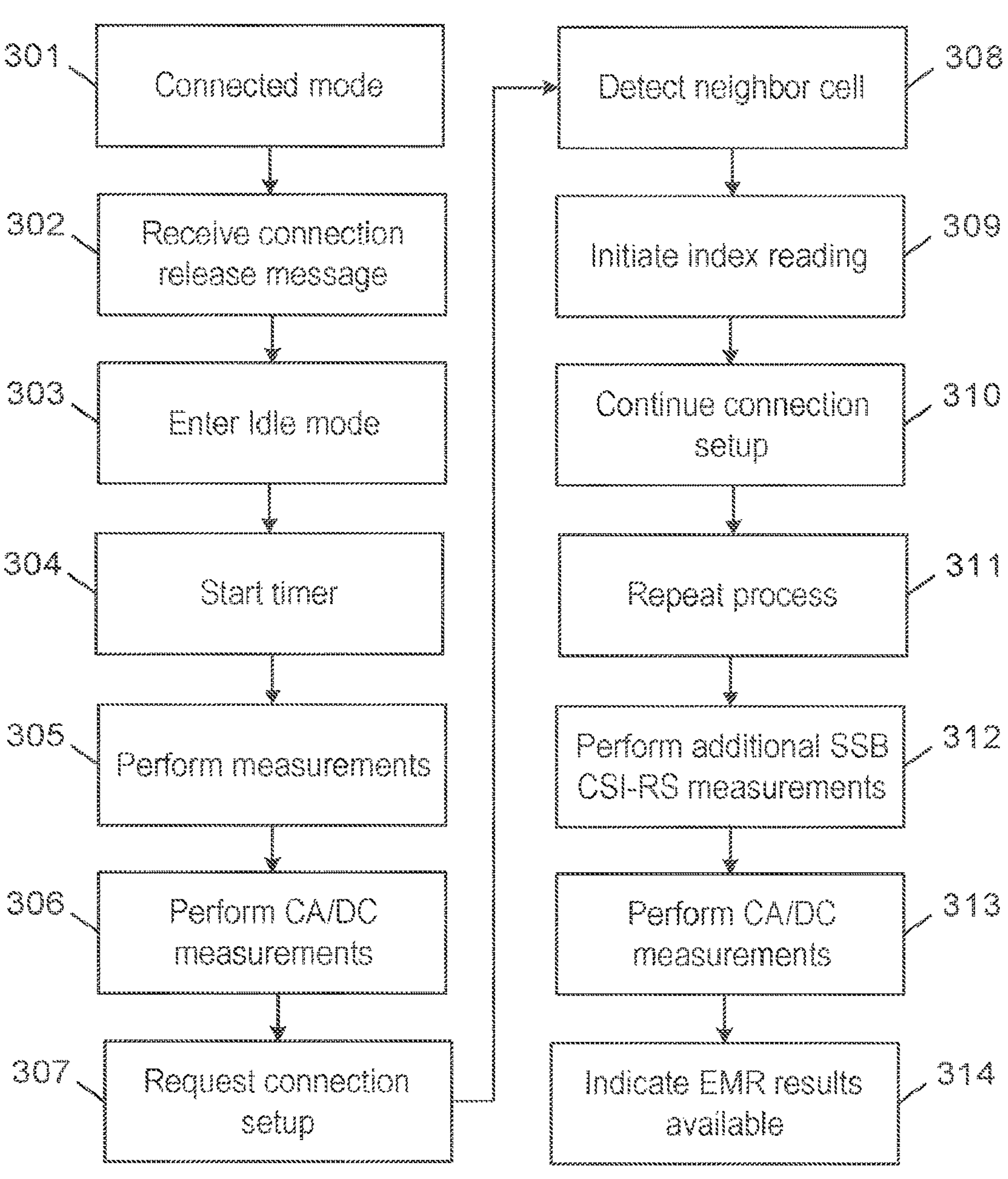
FIG. 3 illustrates an example of a flow diagram of a method according to various example embodiments.

FIG. 3 illustrates an example of a flow diagram of a method for event-triggered EMR reporting that may be performed by a UE, such as UE 720 illustrated in FIG. 7, according to various example embodiments.

At 301, the method may include the UE being in a connected mode, and being configured with either CA, DC, or both (i.e., CA/DC). In particular, the UE may be in CA/DC with a serving cell, such as NE 710 illustrated in FIG. 7, with the serving cell being a PCell, and the neighbor cell being a SCell/PSCell.

At 302, the method may include receiving, from the serving cell, a connection release message, which may include an Idle Mode CA/DC configuration with EMR event. When the connection is released, the UE may be configured, as described. The release information may include the EMR event to be used by the UE when accessing the network (e.g., the serving cell) again.

In certain example embodiments, the EMR configuration may include additional configuration information. For example, the information may include a configuration related to when and how to report any available EMRs when the UE returns to connected mode. In various example embodiments, this measurement configuration information may be included in the "Connection Release" message, for example, in the "include EMR event" information. However, other signaling solutions may also be used that may or may not be associated with the idle mode CA/DC measurement configuration. Hence, the signaling may also be applied for UEs not necessarily supporting the Idle mode CA/DC measurements and reporting feature, and may be applied as an additional feature.

At 303, the method may include entering an Idle Mode. For example, the UE may be camped on the serving cell, while a neighbor cell, such as NE 710 illustrated in FIG. 7, may be detected (while in connected mode) and remain detectable during the Idle Mode.

At 304, the method may include starting a timer, such as a T331 timer.

At 305 and 306, the method may include performing measurements on at least the serving cell, and may perform Idle Mode CA/DC measurements while in Idle Mode and while the timer is running, according to the UE requirements for Idle mode CA/DC measurements. For example, the method may include performing SSB measurements on the serving cell, and/or may perform idle and/or non-idle mode CA/DC measurements on the neighbor cell, according to its configuration, respectively.

At 307, the method may include requesting a connection setup (i.e., MO).

At 308, the method may include detecting and/or verifying (e.g., verifying an already-detected cell, performing one or more measurements, etc.) the neighbor cell, with or without an index. In some example embodiments, the neighbor cell may be a cell, or a cell on a carrier configured as part of idle mode CA/DC measurement configuration at the release. In some other example embodiments, the neighbor cell may be a cell (e.g., on or off a carrier) that has not been configured as part of idle mode CA/DC measurement configuration at the release. However, the UE may not have up-to-date measurement information (e.g., valid measurement results) or index information on the neighbor cell (e.g., the UE has or has not been able to read the index of the neighbor cell and/or the UE is not supporting index-based measurements in idle mode).

At 309, since the UE has been configured with EMR event reporting, the method may include initiating index reading on the detected neighbor cell. In various example embodiments, the UE may only initiate index reading on one detected cell (i.e., neighbor cell), which could be selected by the UE, for example, based on the neighbor cell being the best cell quality (e.g., based upon RSRP, RSRQ, etc.) among possibly more detected cells. In certain example embodiments, the neighbor cell may be indicated by the network. Alternatively, other selection criteria may be used.

At 310, the method may include continuing a connection setup procedure with the serving cell.

At 311, the method may be repeated where the UE measures and/or verifies the neighbor cell. The index reading may continue in parallel with connection setup (and possibly for a period of time after connection has been established/completed) if this is needed (e.g., if the UE has already verified the Index, this step may not be performed).

At 312, the method may include performing additional SSB and/or CSI-RS measurements.

At 313, the method may include entering a Connected mode. One or more EMR events may be configured by the network. For example, the configuration may be based on the UE indicating that no EMR results are available (e.g., based on a network request, such as a UEInformationRequest IE with EMR information) and/or other signaling solutions.

At 314, when the connection setup is complete, the method may include indicating to the serving cell that EMR results are available.

At 315, the method may include receiving, from the serving cell, a UEInformationRequest IE with EMR information. At 316, the method may include responding to the serving cell with a UEInformationResponse IE with EMR results on the neighbor cell.

In certain example embodiments, if the network requests the EMR results, the method may include replying that the UE has partial results. In some example embodiments, the method may include reporting available, but not ready, results to the serving cell. In various example embodiments, the method may include receiving, from the serving cell, an indication to stop further EMR related measurements.

The process may be repeated a plurality of times at 317; for example, at 318, the method may include repeating performing measurements, such as Index reading, SSB, and/or CSI-RS based measurements.

At 319, the method may include evaluating that one or more EMR event(s) are fulfilled, for example, an RSRP, RSRQ, and/or Index reading event (i.e., Index reading is complete), and at 320, the method may include triggering a new measurement report to the serving cell. Once the report has been sent to the serving cell, the method may include the UE no longer being required to perform further EMR related measurements, and thus may stop further measurements. Thus, at 321, the method may include receiving, from the serving cell, a (P)SCell configuration based on the reported EMR related measurement results, where PSCell or SCell(s) may be directly activated or deactivated.

Once the UE has reported the target cell with the index, the network may know which DL SSB (DL beam) the UE can receive, and on which the network can schedule the UE. This may beneficial for CA and/or DC.

Figure 4:
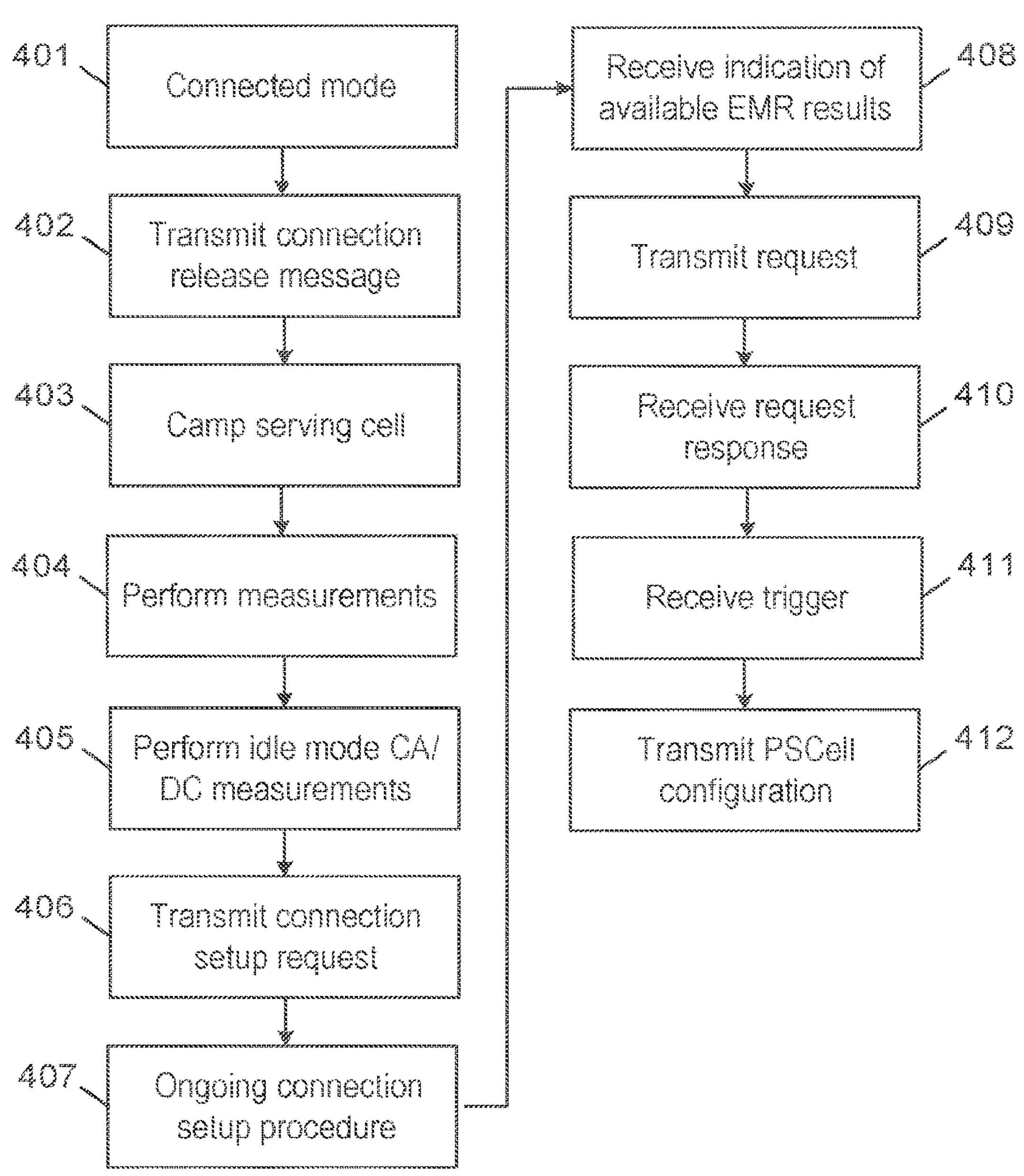
FIG. 4 illustrates an example of a flow diagram of another method according to certain example embodiments.

FIG. 4 illustrates an example of a flow diagram of a method for event-triggered EMR reporting that may be performed by a serving cell, such as NE 710 illustrated in FIG. 7, according to various example embodiments.

At 401, the method may include the serving cell being in a connected mode, and may be configured with either CA, DC, or both (i.e., CA/DC). In particular, the serving cell may be a PCell, and may be in CA/DC with a UE, such as UE 720 illustrated in FIG. 7, and the neighbor cell may be a SCell/PSCell.

At 402, the method may include transmitting a connection release message to the UE, which may include an Idle Mode CA/DC configuration with EMR event. When the connection is released, the UE may be configured, as described. The release information may include the EMR event to be used by the UE when accessing the network (e.g., the serving cell) again.

In certain example embodiments, the EMR configuration may include additional configuration information. For example, the information may include a configuration related to when and how to report any available EMRs when the UE returns to connected mode. In various example embodiments, this measurement configuration information may be included in the "Connection Release" message, for example, in the "include EMR event" information. However, other signaling solutions may also be used that may or may not be associated with the idle mode CA/DC measurement configuration. Hence, the signaling may also be applied for UEs not necessarily supporting the Idle mode CA/DC measurements and reporting feature, and may be applied as an additional feature.

At 403, the method may include the UE being camped on the serving cell, while a neighbor cell, such as NE 710 illustrated in FIG. 7, may be detected (while in connected mode) and remain detectable during the Idle Mode.

At 404 and 405, the method may include having measurements on at least the serving cell, and as well as Idle Mode CA/DC measurements while in Idle Mode and while a timer is running, according to the UE requirements for Idle mode CA/DC measurements. For example, the UE may perform SSB measurements on the serving cell, and/or may perform idle and/or non-idle mode CA/DC measurements on the neighbor cell, according to its configuration, respectively.

At 406, the method may include transmitting a connection setup request (MT call/connection).

At 407, a connection setup procedure may be ongoing between the serving cell and the UE. One or more EMR events may be configured by the network. For example, the configuration may be based on the UE indicating that no EMR results are available (e.g., based on a network request, such as a UEInformationRequest IE with EMR information) and/or other signaling solutions.

At 408, when the connection setup is complete, the method may include receiving an indication from the UE that EMR results are available.

At 409, the method may include transmitting a UEInformationRequest IE to the UE, with EMR information. At 410, the method may include receiving, from the UE, a UEInformationResponse IE with EMR results on the neighbor cell.

In certain example embodiments, if the network requests the EMR results, the method may include receiving a reply that the UE has partial results. In some example embodiments, the method may include receiving a report of available, but not ready, results from the UE. In various example embodiments, the method may include indicating to the UE to stop further EMR related measurements.

At 411, the method may include receiving a trigger for a new measurement report from the UE. Once the report has been received, the UE may no longer be required to perform further EMR related measurements, and thus may stop further measurements. Thus, at 412, the method may include transmitting to the UE a (P)SCell configuration based on the reported EMR related measurement results, where PSCell or SCell(s) may be directly activated or deactivated.

Once the UE has reported the target cell with the index, the network may know which DL SSB (DL beam) the UE can receive, and on which the network can schedule the UE. This may beneficial for CA and/or DC.

Figure 5:
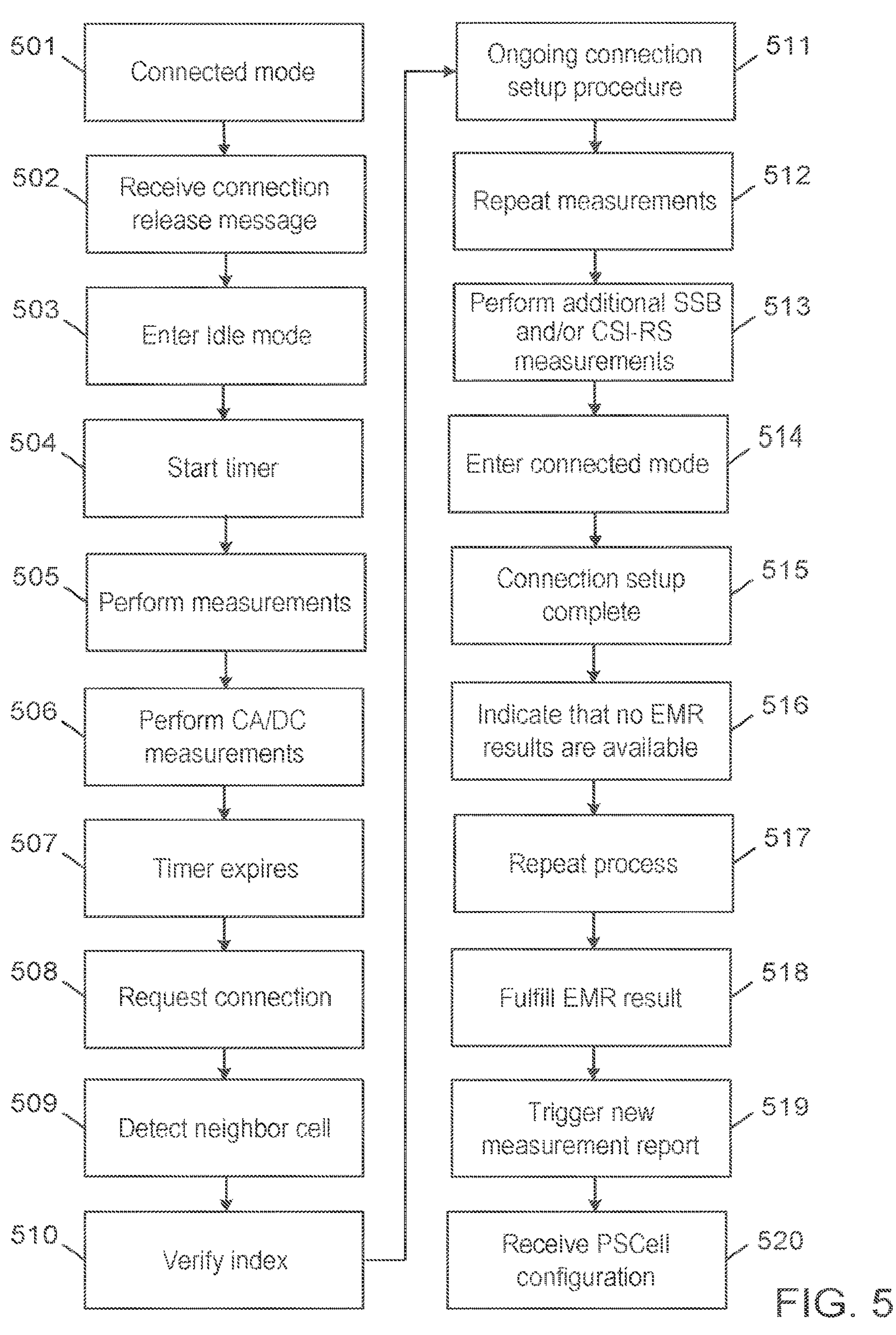
FIG. 5 illustrates an example of a flow diagram of another method according to some example embodiments.

FIG. 5 illustrates an example of a flow diagram of a method for event-triggered EMR reporting that may be performed by a user equipment, such as UE 720 illustrated in FIG. 7, according to various example embodiments.

Although similar to the example embodiments described above in FIG. 2, the following example embodiments may include a timer (e.g., T331) that expires. Specifically, UE implementation may define whether the UE continues EMR measurements, and whether the UE indicates EMR results available when entering connected mode after the timer has expired. However, even if the UE indicates that results are available to the network, there may be no UE measurement accuracy requirements for the reported results once the timer has expired. Thus, any reported results may be unusable by the network. For an event-driven approach, the UE may send a measurement report for an EMR event when the UE has valid measurement results after the timer expires.

In addition, in some example embodiments, the UE may indicate that it does not have EMR results available at the RRC setup complete. However, since the UE may be configured with one or more EMR events, the UE may initiate, or may already have initiated, necessary measurements accordingly. The UE may verify the Index of the best DL beam in a detected cell, such as a neighbor cell, such as NE 710 illustrated in FIG. 7. Once the UE has verified the Index, the UE may transmit the measurement results to the network (e.g., based on the configured event).

At 501, the UE may be in a connected mode, and may be configured with either CA, DC, or both (i.e., CA/DC). In particular, the UE may be in CA/DC with a serving cell, such as NE 710 illustrated in FIG. 7, with the serving cell being a PCell, and the neighbor cell being a SCell/PSCell.

At 502, the method may include receiving, from the serving cell, a connection release message, which may include an Idle Mode CA/DC configuration with EMR event. When the connection is released, the UE may be configured, as described. The release information may include the EMR event to be used by the UE when accessing the network (e.g., serving cell) again.

In certain example embodiments, the EMR configuration may include additional configuration information. For example, the information may include a configuration related to when and how to report any available EMRs when the UE returns to connected mode. In various example embodiments, this measurement configuration information may be included in the "Connection Release" message, for example, in the "include EMR event" information. However, other signaling solutions may also be used that may or may not be associated with the idle mode CA/DC measurement configuration. Hence, the signaling may also be applied for UEs not necessarily supporting the Idle mode CA/DC measurements and reporting feature, and may be applied as an additional feature.

At 503, the method may include entering an Idle Mode. The UE may be camped on the serving cell, while the neighbor cell may be detected (while in connected mode) and remain detectable during the Idle Mode.

At 504, the method may include starting a timer, such as a T331 timer.

At 505 and 506, the method may include performing measurements on at least the serving cell, and may perform Idle Mode CA/DC measurements while in Idle Mode and while the timer is running, according to the UE requirements for Idle mode CA/DC measurements. For example, the UE may perform SSB measurements on the serving cell, and/or may perform idle and/or non-idle mode CA/DC measurements on the neighbor cell, according to its configuration, respectively.

At 507, the timer may expire. After the timer expires, at 508, the method may include requesting a connection, either by the UE (i.e., MO) or by either the serving cell or the neighbor cell (MT call/connection).

At 509, the method may include detecting and/or verifying (e.g., verifying an already-detected cell, performing one or more measurements, etc.) the neighbor cell, with or without an index. In some example embodiments, the neighbor cell may be a cell, or a cell on a carrier configured as part of idle mode CA/DC measurement configuration at the release. In some other example embodiments, the neighbor cell may be a cell (e.g., on or off a carrier) that has not been configured as part of idle mode CA/DC measurement configuration at the release. However, the UE may not have up-to-date measurement information (e.g., valid measurement results) or index information on the neighbor cell (e.g., the UE has or has not been able to read the index of the neighbor cell and/or the UE is not supporting index-based measurements in idle mode). At 510, the method may include verifying the index, which may be initiated based on the configured EMR event. In some example embodiments, the UE may have read and potentially verified the Index.

At 511, a connection setup procedure may be ongoing between the UE and the serving cell.

At 512, the process may be repeated where the UE measures and/or verifies the neighbor cell. The index reading may continue in parallel with connection setup (and possibly for a period of time after connection has been established/completed) if this is needed (e.g., if the UE has already verified the Index, this step may not be performed).

At 513, the method may include performing additional SSB and/or CSI-RS measurements.

At 514, the method may include entering a Connected mode. Since the timer expired at 507, one or more EMR events may be configured by the network. For example, the configuration may be based on the UE indicating that no EMR results are available (e.g., based on a network request, such as a UEInformationRequest IE with EMR information) and/or other signaling solutions.

At 515, when the connection setup is complete, the method may include indicating to the serving cell that no EMR results are available at 516.

The process may be repeated a plurality of times at 517; for example, at 517, the method may include repeating performing measurements, such as Index reading, SSB, and/or CSI-RS based measurements.

At 518, the method may include fulfilling one or more EMR event(s) (e.g., Index reading is complete), and at 519, the method may include triggering a new measurement report to the serving cell. Once the report has been sent to the serving cell, the UE may no longer be required to perform further EMR related measurements. Thus, at 520, the method may include receiving from the serving cell a (P)SCell configuration based on the reported EMR related measurement results, where PSCell or SCell(s) may be directly activated or deactivated.

Once the UE has reported the target cell with the index, the network may know which DL SSB (DL beam) the UE can receive, and on which the network can schedule UE 230. This may beneficial for CA and/or DC.

Figure 6:
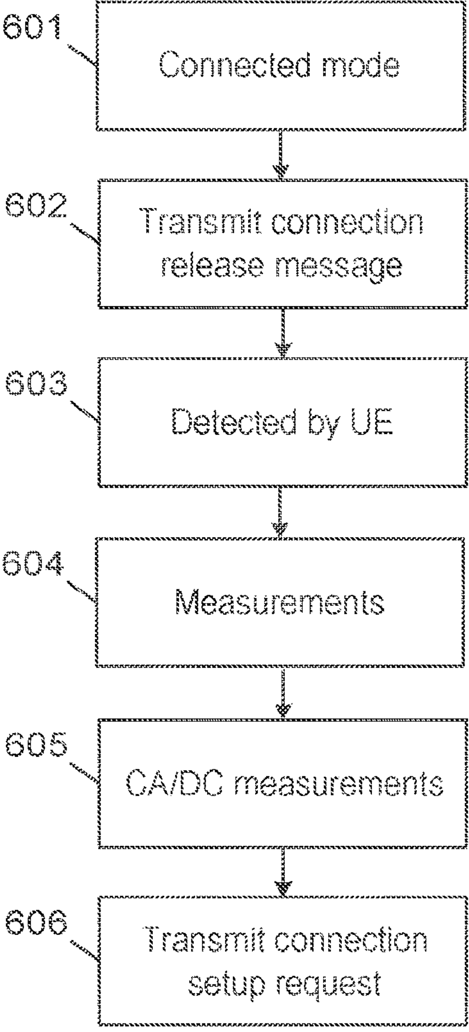
FIG. 6 illustrates an example of a flow diagram of another method according to various example embodiments.

FIG. 6 illustrates an example of a flow diagram of a method for event-triggered EMR reporting that may be performed by a network entity, such as NE 710 illustrated in FIG. 7, according to various example embodiments.

Although similar to the example embodiments described above in FIGS. 2 and 5, the following example embodiments may include a timer (e.g., T331) that expires. Specifically, UE implementation may define whether the UE continues EMR measurements, and whether a UE, such as UE 720 illustrated in FIG. 7, indicates EMR results available when entering connected mode after the timer has expired. However, even if the UE indicates that results are available to the network, there may be no UE measurement accuracy requirements for the reported results once the timer has expired. Thus, any reported results may be unusable by the network. For an event-driven approach, the UE may send a measurement report for an EMR event when the UE has valid measurement results after the timer expires.

In addition, in some example embodiments, the UE may indicate that it does not have EMR results available at the RRC setup complete. However, since the UE may be configured with one or more EMR events, the UE may initiate, or may already have initiated, necessary measurements accordingly. The UE may verify the Index of the best DL beam in a detected cell, such as the neighbor cell. Once the UE has verified the Index, the UE may transmit the measurement results to the network (e.g., based on the configured event).

At 601, the method may include the serving cell being in a connected mode, and may be configured with either CA, DC, or both (i.e., CA/DC). In particular, the serving cell may be a PCell, and may be in CA/DC with a UE, such as UE 720 illustrated in FIG. 7, and the neighbor cell may be a SCell/PSCell.

At 602, the method may include transmitting a connection release message to the UE, which may include an Idle Mode CA/DC configuration with EMR event. When the connection is released, the UE may be configured, as described. The release information may include the EMR event to be used by the UE when accessing the network (e.g., the serving cell) again.

In certain example embodiments, the EMR configuration may include additional configuration information. For example, the information may include a configuration related to when and how to report any available EMRs when the UE returns to connected mode. In various example embodiments, this measurement configuration information may be included in the "Connection Release" message, for example, in the "include EMR event" information. However, other signaling solutions may also be used that may or may not be associated with the idle mode CA/DC measurement configuration. Hence, the signaling may also be applied for UEs not necessarily supporting the Idle mode CA/DC measurements and reporting feature, and may be applied as an additional feature.

At 603, the method may include the UE being camped on the serving cell, while a neighbor cell, such as NE 710 illustrated in FIG. 7, may be detected (while in connected mode) and remain detectable during the Idle Mode.

At 604 and 605, the method may include having measurements on at least the serving cell, and as well as Idle Mode CA/DC measurements while in Idle Mode and while a timer is running, according to the UE requirements for Idle mode CA/DC measurements. For example, the UE may perform SSB measurements on the serving cell, and/or may perform idle and/or non-idle mode CA/DC measurements on the neighbor cell, according to its configuration, respectively.

At 606, the method may include transmitting a connection setup request (MT call/connection).

FIG. 7 illustrates an example of a system according to certain example embodiments. In one example embodiment, a system may include multiple devices, such as, for example, NE 710 and/or UE 720.

NE 710 may be one or more of a base station (e.g., 3G UMTS NodeB, 4G LTE Evolved NodeB, or 5G NR Next Generation NodeB), a serving gateway, a server, and/or any other access node or combination thereof.

NE 710 may further comprise at least one gNB-centralized unit (CU), which may be associated with at least one gNB-distributed unit (DU). The at least one gNB-CU and the at least one gNB-DU may be in communication via at least one F1 interface, at least one $X_n$-C interface, and/or at least one NG interface via a $5^{th}$ generation core (5GC).

UE 720 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Furthermore, NE 710 and/or UE 720 may be one or more of a citizens broadband radio service device (CBSD).

NE 710 and/or UE 720 may include at least one processor, respectively indicated as 711 and 721. Processors 711 and 721 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 712 and 722. The memory may be fixed or removable. The memory may include computer program instructions or computer code contained therein. Memories 712 and 722 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 711 and 721, memories 712 and 722, and any subset thereof, may be configured to provide means corresponding to the various blocks of FIGS. 1-6. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 7, transceivers 713 and 723 may be provided, and one or more devices may also include at least one antenna, respectively illustrated as 714 and 724. The device may have many antennas, such as an array of antennas configured for multiple input multiple output (MIMO) communications, or multiple antennas for multiple RATs. Other configurations of these devices, for example, may be provided. Transceivers 713 and 723 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 1-6). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 1-6. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 8:
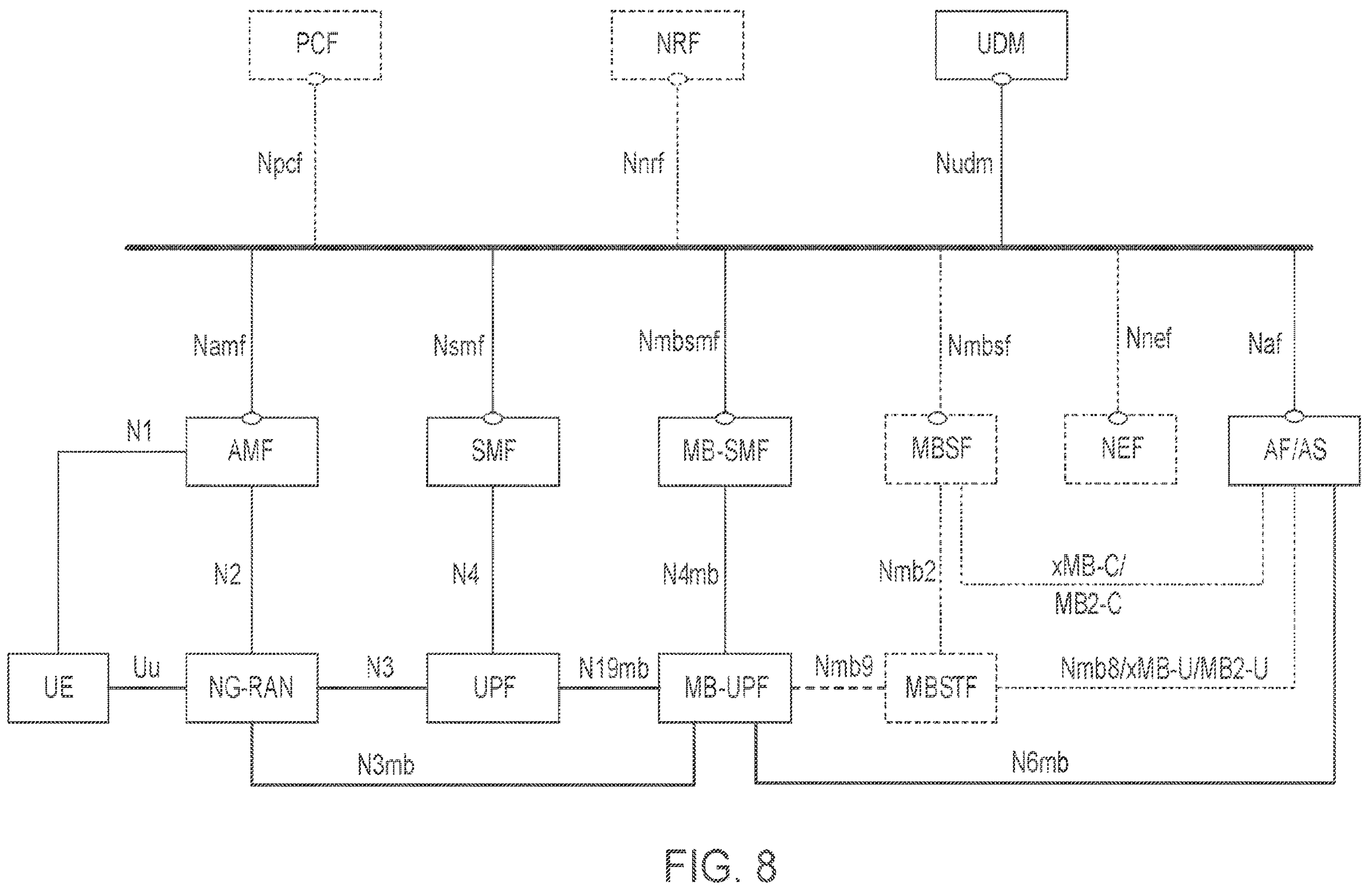
FIG. 8 illustrates an example of a 5G network and system architecture according to some example embodiments.

FIG. 8 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 8 may be similar to NE 710 and UE 720, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

According to certain example embodiments, processors 711 and 721, and memories 712 and 722, may be included in or may form a part of processing circuitry or control circuitry. In addition, in some example embodiments, transceivers 713 and 723 may be included in or may form a part of transceiving circuitry.

In some example embodiments, an apparatus (e.g., NE 710 and/or UE 720) may include means for performing a method, a process, or any of the variants discussed herein. Examples of the means may include one or more processors, memory, controllers, transmitters, receivers, and/or computer program code for causing the performance of the operations.

In various example embodiments, apparatus 720 may be controlled by memory 722 and processor 721 to receive, from a network entity, a measurement configuration for early measurement reporting; and transmit, to the network entity, an early measurement reporting result. The measurement configuration comprises at least one early measurement reporting event associated with the apparatus re-accessing the network entity.

Certain example embodiments may be directed to an apparatus that includes means for performing any of the methods described herein including, for example, means for receiving, from a network entity, a measurement configuration for early measurement reporting; and means for transmitting, to the network entity, an early measurement reporting result. The measurement configuration comprises at least one early measurement reporting event associated with the apparatus re-accessing the network entity.

In various example embodiments, apparatus 710 may be controlled by memory 712 and processor 711 to transmit, to a user equipment, a measurement configuration for early measurement reporting; and receive, from the user equipment, an early measurement reporting result. The measurement configuration comprises at least one early measurement reporting event associated with the user equipment re-accessing the apparatus.

Certain example embodiments may be directed to an apparatus that includes means for performing any of the methods described herein including, for example, means for transmitting, to a user equipment, a measurement configuration for early measurement reporting; and means for receiving, from the user equipment, an early measurement reporting result. The measurement configuration comprises at least one early measurement reporting event associated with the user equipment re-accessing the apparatus.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

3GPP 3$^{rd}$ Generation Partnership Project
5G 5$^{th}$ Generation
5GC 5$^{th}$ Generation Core
6G 6$^{th}$ Generation
AF Application Function
ASIC Application Specific Integrated Circuit
CA Carrier Aggregation
CBSD Citizens Broadband Radio Service Device
CPU Central Processing Unit
CSI-RS Channel Status Information Reference Signal
CU Centralized Unit
DC Dual Connectivity
DRX Discontinuous Reception
DU Distributed Unit
eMBB Enhanced Mobile Broadband
EMR Early Measurement Reporting
eNB Evolved Node B
FR Frequency Range
gNB Next Generation Node B
GPS Global Positioning System
HDD Hard Disk Drive
IE Information Element
IoT Internet of Things
LTE Long-Term Evolution
LTE-A Long-Term Evolution Advanced
MEMS Micro Electrical Mechanical System
MIMO Multiple Input Multiple Output
mMTC Massive Machine Type Communication
MO Mobile Originated
MT Mobile Terminated
NE Network Entity
NG Next Generation
NG-eNB Next Generation Evolved Node B
NG-RAN Next Generation Radio Access Network
NR New Radio
PCell Primary Cell
PCI Physical Cell Identifier
PDA Personal Digital Assistance
PSCell Primary Serving Cell
QoS Quality of Service
RAM Random Access Memory
RAN Radio Access Network
RAT Radio Access Technology
RF Radio Frequency
ROM Read-Only Memory
RSRP Reference Signal Received Power
RSRQ Reference Signal Received Quality
SCell Secondary Cell
SCG Secondary Cell Group
SIB System Information Block
SS Synchronization Signal
SSB Synchronization Signal Block
UE User Equipment
UMTS Universal Mobile Telecommunications System
UPF User Plane Function
URLLC Ultra-Reliable and Low-Latency Communication
UTRAN Universal Mobile Telecommunications System Terrestrial Radio Access Network

We claim:

1. An apparatus comprising:
at least one processor; and
at least one memory storing instructions that, when executed by the at least one processor, cause the apparatus at least to:
receive, from a network entity, a connection release message comprising a measurement configuration for early measurement reporting,
wherein the measurement configuration comprises at least one an early measurement reporting event associated with the apparatus re-accessing the network entity, and a configuration of how to report early measurement reporting when the apparatus returns to a connected mode;
enter an idle mode;
start a timer;
perform measurements on the network entity while in the idle mode and while the timer is running;
request a connection setup, after the timer expires;
detect a neighbor cell;
initiate an index reading of the detected neighbor cell and verify an index of the neighbor cell, based on the early measurement reporting event;
enter a connected mode; and
transmit, to the network entity, an early measurement reporting result, wherein the early measurement reporting result comprises an indication of availability of early measurement results, and wherein the indication of availability of early measurement results comprises a radio resource control setup complete message indicating; that no early measurement reporting results are available, that early measurement results are available, that only partial results are available, or that early measurement results are available but not ready; and
receive, from the network entity, an indication to stop further early measurement reporting related measurements based on the indication of availability of early measurement reporting results.

* * * * *